Feb. 18, 1930.   V. J. BURNELLI   1,747,696
RETRACTABLE WHEEL FOR THE PONTOONS OF AMPHIBIAN AIRPLANES
Filed Nov. 2, 1927   2 Sheets-Sheet 1
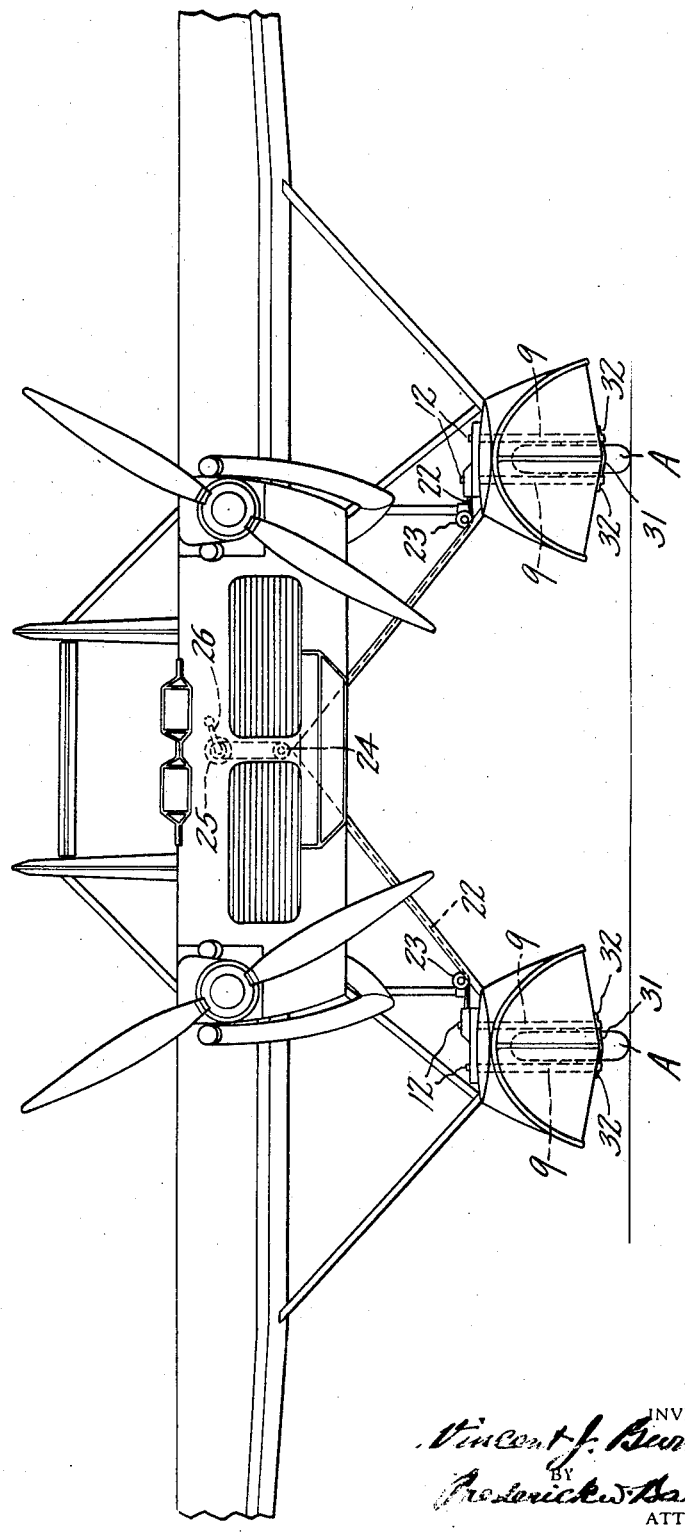

Feb. 18, 1930.   V. J. BURNELLI   1,747,696
RETRACTABLE WHEEL FOR THE PONTOONS OF AMPHIBIAN AIRPLANES
Filed Nov. 2, 1927   2 Sheets-Sheet 2
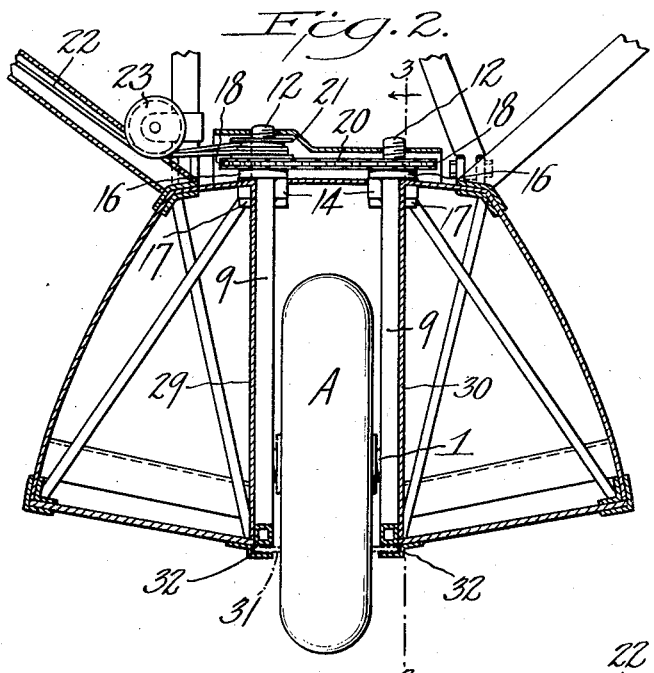
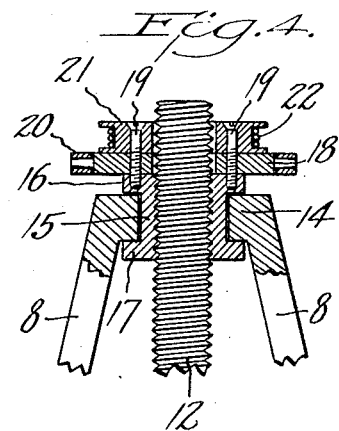
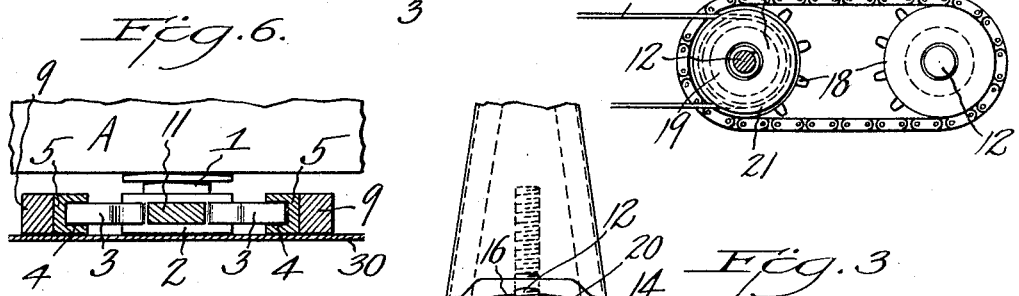
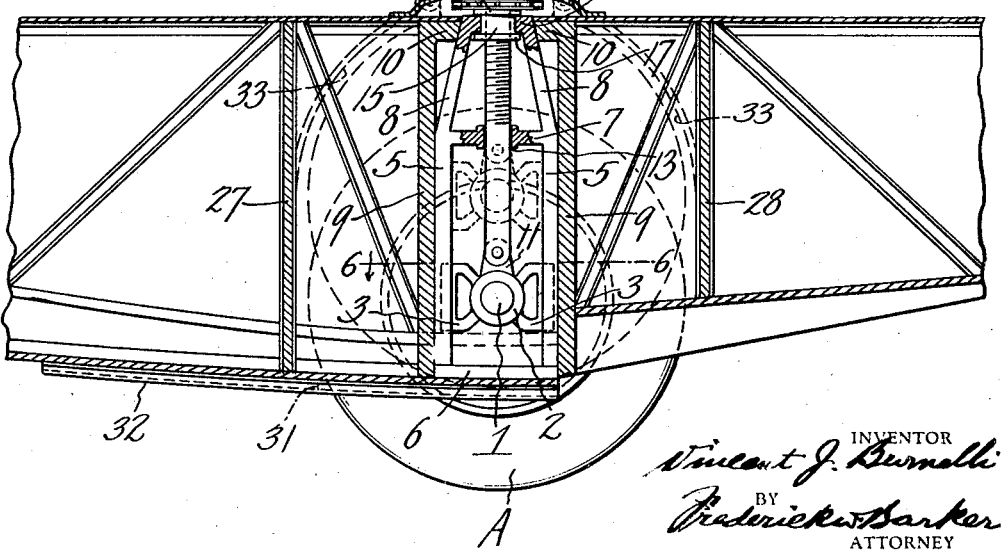

Patented Feb. 18, 1930

1,747,696

UNITED STATES PATENT OFFICE.

VINCENT J. BURNELLI, OF NEW YORK, N. Y., ASSIGNOR TO THE UPPERCU-BURNELLI CORPORATION, A CORPORATION OF DELAWARE

RETRACTABLE WHEEL FOR THE PONTOONS OF AMPHIBIAN AIRPLANES

Application filed November 2, 1927. Serial No. 230,644.

This invention relates to amphibian airplanes such as are provided with pontoons for their support on water and with wheels for surface traction, and my improvements are directed to means whereby the wheels are held partly encased within the pontoons while partly extended from said pontoons for operation on a solid surface; also to means whereby said wheels may be retracted for complete encasement within said pontoons when the machine is in flight or is intended to operate on water.

Also my invention includes control means, operable from the pilot's seat, for the simultaneous projection or retraction of the wheels carried by a pair of pontoons.

Other features and advantages of my invention will hereinafter appear.

In the drawings:

Figure 1 is a front elevation of an airplane of the Remington-Burnelli type, having a wide fuselage capable of containing two motors side by side in its leading edge, also having monoplane wings extending from the sides of said fuselage, and with pontoons carried by frames that are attached to said fuselage and wings respectively, said pontoons carrying retractable wheels.

Fig. 2 is an enlarged transverse section through one of the pontoons, showing the wheel carried thereby.

Fig. 3 is a partial side sectional view of the pontoon, showing the wheel supporting and retracting means, also showing the extended and retracted positions of the wheels on line 3—3 of Fig. 2.

Fig. 4 is a further enlarged, detail view, partly in section, showing a portion of the wheel retracting means.

Fig. 5 is a top plan view, partly in section, showing the treaded members at opposite side of a wheel forming part of a wheel support, and the means for imparting conjoint vertical movement to said members, and Fig. 6 is a section on the line 6—6 of Fig. 3, showing the guides for the traveller elements that extend from the wheel axle bearing.

The wheels employed with the pontoons are positioned about midway of their length, near the centre of gravity of the airplane and just foward of the usual planing step formed in the pontoon.

Said wheels, here indicated at A, each have an axle 1 that is journalled at each end in like bearings 2, said bearings each having oppositely extended wings or travellers 3, 3, which respectively engage in grooves 4, 4 formed in the vertical members 5, 5 of a frame that has the bottom connecting member 6, upper cross-bar 7 and upwardly converging extensions 8, 8 of members 5, 5. The frame composed of members 5, 6, 7 and 8 will be referred to hereinafter as a guide frame and it will be understood that each pontoon is equipped with two of these guide frames, in spaced relation, disposed at opposite sides of the wheel. I also provide outer frames each composed of the vertical members 9, 9 that extend between the top and bottom of the pontoon, said members 9, 9 lying against the outer sides respectively of the guide frame members 5, 5, said members 9, 9 having upper, angularly inturned portions 10, 10 that abut against the outer sides of the guide frame extensions 8, 8. The purpose of the outer frame is to reinforce the guide frame and maintain it in its localized position.

Each bearing 2 has an upwardly extended lug 11, with which is pivotally engaged a vertically positioned member 12 that extends through a guide orifice 13 provided therefor in the cross-bar 7 of the guide frame, said member 12 being threaded for that portion of its length above cross-bar 7.

The frame extensions 8, 8 terminate in a horizontally disposed ring 14, within which is revolubly fitted an internally threaded thimble 15, having an upper flange 16 and a lower flange 17, said flanges engaging respectively with the upper and lower surfaces of ring 14, to prevent vertical movement of said thimble. The threaded portion of member 12 engages the thread of the thimble so that rotation of the latter will accord vertical movement to member 12 and hence to the wheel carried thereby. It is therefore necessary to provide means for rotating the thimble in order to either project or retract the member 12. Since each wheel in its pontoon is provided with two carrying members 12, with their associated parts, they must be operated in unison.

Therefore a sprocket wheel 18 is attached, as by screws 19, to the flange 16 of its thimble, and the sprocket wheels 18 of a pair thereof are connected by a chain 20. Thus connected the rotation of one sprocket wheel and its attached thimble is communicated to the other sprocket wheel and its thimble of the pair.

Also it is necessary that the wheels in both pontoons be movable vertically in unison.

To these ends the sprocket wheels pertaining to the members 12 at the inner sides of the wheels have secured thereon each a spool 21, and cables 22, adapted to wind on said spools, are passed over pulleys 23 and 24 to a drum 25 which is rotatable by a crank 26 located within reach by the pilot.

Obviously the sprockets and thimbles can be rotated to elevate the members 12 and the wheels in the act of rotating drum 26 in one direction, thereby retracting the wheels into the pontoons, and conversely, rotation of drum 26 in the other direction will operate to lower the wheels and project them beyond the pontoons.

A compartment is provided within each pontoon to enclose the wheel and its supporting members, said compartment being formed by the transverse bulkheads 27, 28, spaced apart slightly more than the wheel diameter, and longitudinally disposed bulkheads 29, 30, spaced apart sufficiently to contain between them the frame composed of members 9, the bulkheads 29, 30 extending between the bulkheads 27, 28. All these bulkheads extend vertically between the pontoon base and top. The bottom of the wheel casing thus formed is provided with a sliding shutter 31, operable in guide-ways 32, for closing the wheel casing when the wheel has been retracted therein.

Suitable means (not shown) may be employed for operating the shutter. The upper corners in the wheel casing may be shut off by curved strips 33 to prevent the accumulation therein of matter thrown up by the wheel.

Variations within the spirit and scope of my invention are equally comprehended in the foregoing disclosure.

I claim:

1. The combination with a pontoon having an intermediate compartment of pairs of vertical guideways in spaced relation within said compartment, a wheel disposed between said pairs of guideways, a wheel axle, bearings for said axle having travellers that are slidable in said guideways, vertical members engaging said bearings at opposite sides of the wheels, respective means for moving said vertical members to adjust the vertical position of the wheel, and means for synchronizing the operation of said means for moving said vertical members.

2. The combination with an airplane having a pair of pontoons, each pontoon provided with an intermediate compartment, of pairs of vertical guideways in spaced relation respectively in said compartments, a wheel for each pontoon disposed between said pairs of guideways, each wheel having an axle, bearings for each axle having travellers that are slidable in said guideways, vertical members engaging said bearings, at opposite sides of each wheel, respective means for moving said vertical members to adjust the vertical positions of said wheels, and means for synchronizing the operation of said means for moving the vertical members with respect to both wheels.

New York, October 24th, 1927.

VINCENT J. BURNELLI.